(12) United States Patent
Aoki

(10) Patent No.: US 11,993,464 B2
(45) Date of Patent: May 28, 2024

(54) RAW MATERIAL DISCHARGE DEVICE, METHOD OF PROCESSING OF ELECTRONIC/ELECTRICAL DEVICE COMPONENT SCRAP, AND METHOD OF RAW MATERIAL DISCHARGE FOR ELECTRONIC/ELECTRICAL DEVICE COMPONENT SCRAP

(71) Applicant: JX METALS CORPORATION, Tokyo (JP)

(72) Inventor: Katsushi Aoki, Hitachi (JP)

(73) Assignee: JX METALS CORPORATION, Tokyo (JP)

( * ) Notice: Subject to any disclaimer, the term of this patent is extended or adjusted under 35 U.S.C. 154(b) by 153 days.

(21) Appl. No.: 17/615,994

(22) PCT Filed: Jun. 2, 2020

(86) PCT No.: PCT/JP2020/021821
§ 371 (c)(1),
(2) Date: Dec. 2, 2021

(87) PCT Pub. No.: WO2020/246479
PCT Pub. Date: Dec. 10, 2020

(65) Prior Publication Data
US 2022/0324657 A1    Oct. 13, 2022

(30) Foreign Application Priority Data

Jun. 3, 2019 (JP) ................................ 2019-104043
Mar. 12, 2020 (JP) ................................ 2020-043351

(51) Int. Cl.
*B65G 47/19* (2006.01)
*B65G 15/42* (2006.01)
(Continued)

(52) U.S. Cl.
CPC ............ *B65G 47/19* (2013.01); *B65G 47/08* (2013.01); *B65G 65/08* (2013.01); *B65G 65/40* (2013.01);
(Continued)

(58) Field of Classification Search
CPC ........ B65G 47/19; B65G 47/08; B65G 65/08; B65G 65/40; B65G 15/42; B65G 2203/0258
(Continued)

(56) References Cited

U.S. PATENT DOCUMENTS 2,428,852 A * 10/1947 Muir ......................... B22C 5/04
198/530
2,543,519 A * 2/1951 Baechli ................. B65G 47/00
414/528
(Continued)

FOREIGN PATENT DOCUMENTS

DE  24 50 471 A1  5/1976
DE  196 45 777 A1  6/1998
(Continued)

OTHER PUBLICATIONS

International Preliminary Report on Patentability and English translation of the Written Opinion of the International Searching Authority (Forms PCT/IB/338, PCT/IB/373, and PCT/ISA/237) for International Application No. PCT/JP2020/021821, dated Dec. 16, 2021.
(Continued)

*Primary Examiner* — James R Bidwell
(74) *Attorney, Agent, or Firm* — Birch, Stewart, Kolasch & Birch, LLP

(57) ABSTRACT

Provided are a raw material discharge device, a method of processing an electronic and electrical device component scrap, and a raw material discharging method of an elec-
(Continued)

tronic and electrical device component scrap, which are capable of efficiently discharging the raw material having various shapes, specific gravities and shapes in each fixed amount. A raw material discharge device including: a storage unit 1 which stores a raw material and comprising a discharge port 11 at one end; a discharge unit 2 arranged at a bottom surface 15 of the storage unit 1, which conveys the raw material toward the discharge port 11 and discharges the raw material to an outside of the storage unit 1; an adjustment unit 3 including a plurality of struts 31 extending from above to below the discharge unit 2 and adjusting an amount of the raw material to be discharged by holding a part of the raw material with the struts 31; wherein a ratio (d1/d2) of a distance (d1) between a strut 31 closest to a side surface 13, 14 of the storage unit 1 and the side surface 13, 14 of the storage unit 1 to a narrowest distance (d2) between the struts 31 in a center portion of the storage unit 1, and a ratio (H1/H2) of a height of the strut 31 closest to the side surface 13, 14 of the storage unit 1 from a floor to a minimum height (H2) of a strut 31 which is other than the strut 31 closest to the side surface of the storage unit 1 from the floor are respectively adjustable so as to prevent clogging of the raw material being discharged to the outside of the storage unit 1.

14 Claims, 9 Drawing Sheets

(51) Int. Cl.
*B65G 47/08* (2006.01)
*B65G 65/08* (2006.01)
*B65G 65/40* (2006.01)
(52) U.S. Cl.
CPC ...... *B65G 15/42* (2013.01); *B65G 2203/0258* (2013.01)

(58) Field of Classification Search
USPC ........ 198/570, 550.2, 550.01, 531, 534, 635
See application file for complete search history.

(56) References Cited

U.S. PATENT DOCUMENTS

| | | | | |
|---|---|---|---|---|
| 3,750,861 A | * | 8/1973 | Holtsclaw | .............. B65G 47/78 198/720 |
| 3,973,573 A | * | 8/1976 | Seiwert | ..................... B08B 3/06 134/104.4 |
| 2023/0089544 A1 | * | 3/2023 | Riconosciuto | ............ B09B 3/35 241/60 |

FOREIGN PATENT DOCUMENTS

| | | |
|---|---|---|
| DE | 10.2004 038 537 B3 | 2/2006 |
| JP | 8-54623 U | 7/1994 |
| JP | 9-78151 A | 3/1997 |
| JP | 9-208035 A | 8/1997 |
| JP | 2946170 B2 | 9/1999 |
| JP | 2003-54766 A | 2/2003 |
| JP | 2005-15127 A | 1/2005 |
| JP | 3688197 B2 | 8/2005 |
| JP | 2013-230931 A | 11/2013 |
| JP | 2015-123418 A | 7/2015 |
| JP | 2020-29313 A | 2/2020 |

OTHER PUBLICATIONS

Japanese Notice of Reasons for Refusal for Japanese Application No. 2020-043351, dated Nov. 29, 2022, with English Translation.
International Search Report for PCT/JP2020/021821 dated Aug. 4, 2020.

* cited by examiner

RAW MATERIAL DISCHARGE DEVICE, METHOD OF PROCESSING OF ELECTRONIC/ELECTRICAL DEVICE COMPONENT SCRAP, AND METHOD OF RAW MATERIAL DISCHARGE FOR ELECTRONIC/ELECTRICAL DEVICE COMPONENT SCRAP

FIELD OF THE INVENTION

The present invention relates to a raw material discharge device, a method of processing an electronic and electrical device component scrap, and a raw material discharging method of an electronic and electrical device component scrap.

BACKGROUND OF THE INVENTION

From the viewpoint of recent resource conservation, recovery of variable metals from an electronic and electrical device component scrap such as waste electronic home appliances, PCs and mobile phones has increasingly become popular, and an efficient method for recovering the valuable metals has been studied and proposed.

For example, Japanese Patent Application Publication No. H09-78151 A (Patent Literature 1) discloses a recycling method for valuable metals, including the steps of charging scrap containing valuable metals into a flash furnace for smelting copper ores, and recovering the valuable metals into a mat that is retained in the furnace. According to such a recycling method, scrap processing can be combined with a copper smelting step in the copper smelting flash furnace, so that the valuable metals can be recovered at low cost even from scrap having a lower content of the valuable metals.

However, in the processing using the copper smelting flash furnace as disclosed in Patent Literature 1, an increased amount of the electronic and electrical device component scrap processed may lead to an increase in a carbon component contained in organic substances such as resins forming the electronic and electrical device component scrap, which may cause troubles due to over-reduction in the smelting furnace. On the other hand, since the amount of the electronic and electrical device component scrap processed tends to be increased in recent years, there is a need for efficient processing in the copper smelting flash furnace.

As one of methods for preventing the generation of troubles due to over-reduction in the copper smelting flash furnace, it is proposed that the electronic and electrical device component scrap is crushed before processing of the electronic and electrical device component scrap in a copper smelting flash furnace to reduce the volume. For example, Japanese Patent Application Publication No. 2015-123418 A (Patent Literature 2) discloses that electrical and electronic device component scrap containing copper is incinerated and then crushed to have a predetermined size or less, and the crushed electrical and electronic device component scrap is processed in a copper smelting furnace.

However, the increased amount of electronic and electrical device component scrap processed leads to introduction of a larger amount of unwanted substances (smelting inhibitors) for processing in the subsequent copper smelting step than in the conventional techniques, depending on types of substances contained in the electronic and electrical device component scrap. An increased amount of the smelting inhibitors introduced into such a copper smelting step arises a situation where an amount of the electronic and electrical device component scrap to be introduced has to be limited.

Numerous efforts have been made in the past to develop thermodynamic methods in the smelting process of copper smelting and electrolyte refining methods in the electrolysis process, including smelting inhibitors derived from natural ores. However, there are still many issues to be solved in the treatment of the electronic and electrical device component scrap which contains a significantly higher percentage of smelting inhibitors compared to natural ores.

CITATION LIST

Patent Literatures

[Patent Literature 1] Japanese Patent Application Publication No. H09-78151 A

[Patent Literature 2] Japanese Patent Application Publication No. 2015-123418 A

SUMMARY OF THE INVENTION

Technical Problem

The present inventors have been studying various sorting processes and sorting machines suitable for efficiently sorting raw materials containing valuable metals for processing in the smelting process from the electronic and electric component scraps and for removing substances that inhibit smelting.

However, raw materials such as the electronic and electric component scrap which is a mixture of materials having various shapes, specific gravities, and shapes are particularly prone to tangling with each other, and it is difficult to separate these materials carried in by a certain amount. There is a limit to the amount of manual work that can be done, and it has been desirable to consider a more efficient method and equipment for removing the materials.

In view of the above issues, the present disclosure provides a raw material discharge device, a method of processing an electronic and electrical device component scrap, and a raw material discharging method of an electronic and electrical device component scrap, which are capable of efficiently discharging a raw material having various shapes, specific gravities and shapes in each fixed amount.

Solution to Problem

In order to solve the above problem, the inventor has made thorough investigation and has found that it is effective to provide a storage unit that can both store and dispense the raw material and optimize a distance between struts for adjusting a discharge amount of the raw material during discharging the raw material.

An aspect of a present embodiment is provided with a raw material discharge device encompassing a storage unit which stores a raw material and including a discharge port at one end; a discharge unit arranged at a bottom surface of the storage unit, which conveys the raw material toward the discharge port and discharges the raw material to an outside of the storage unit; an adjustment unit including a plurality of struts extending from above to below the discharge unit and adjusting an amount of the raw material to be discharged by holding a part of the raw material with the struts; wherein a ratio (d1/d2) of a distance (d1) between a strut closest to a side surface of the storage unit and the side surface of the storage unit to a narrowest distance (d2) between the struts in a center portion of the storage unit, and a ratio (H1/H2) of a height (H1) of the strut closest to the side surface of the storage unit from a floor to a minimum height (H2) of a strut other than the strut closest to the side surface of the storage unit from the floor are respectively adjustable so as to prevent clogging of the raw material being discharged to the outside of the storage unit.

Another aspect of an embodiment of the present invention is provided with a raw material discharge device encompassing: a raw material discharge unit including: a storage unit which stores a raw material and including a discharge port at one end; a discharge unit arranged at a bottom surface of the storage unit, conveying the raw material toward the discharge port and discharging the raw material to an outside of the storage unit; and an adjustment unit including a plurality of struts extending from above to below the discharge unit and adjusting an amount of the raw material to be discharged by holding a part of the raw material with the struts; a conveyor including a conveyance surface to convey the raw material discharged from the discharge port; and two or more guide plates arranged apart from each other in a conveyance direction of the conveyor and arranged on the conveyor so as to alternately project from both ends of the conveyor surface.

Still another aspect of an embodiment of the present invention is provided with a method of processing an electronic and electrical device component scrap encompassing: storing electronic and electrical device component scraps in a storage unit to store a raw material, the storage unit including a discharge port provided at one end to discharge the raw material; conveying the electronic and electrical device component scraps toward the discharge port by a discharge unit arranged at a bottom surface of the storage unit and discharging the electronic and electrical device component scraps to an outside of the storage unit while holding a part of the electronic and electrical device component scraps by adjusting a distance between a plurality of struts extending from above to below the discharge unit.

Still another aspect of an embodiment of the present invention is provided with a raw material discharging method of an electronic and electrical device component scrap encompassing: storing electronic and electrical device component scraps in a storage unit to store a raw material, the storage unit including a discharge port provided at one end to discharge the raw material; conveying the electronic and electrical device component scraps toward the discharge port by a discharge unit arranged at a bottom surface of the storage unit; discharging the electronic and electrical device component scraps to a conveyor arranged below the storage unit while holding a part of the electronic and electrical device component scraps by adjusting a distance between a plurality of struts extending from above to below the discharge unit; and averaging a height of the raw material by meandering a flow of the raw material by bringing the raw material into contact with two or more guide plates arranged along a conveyance direction of the conveyor so as to be alternately projected from both ends of a conveyance surface of the conveyor.

Advantageous Effects of Invention

According to the present disclosure, it is possible to provide a raw material discharge device, a method of processing an electronic and electrical device component scrap, and a raw material discharging method of an electronic and electrical device component scrap, which are capable of efficiently discharging a raw material having various shapes, specific gravities and shapes in each fixed amount.

DETAILED DESCRIPTION OF THE INVENTION

Figure 1:
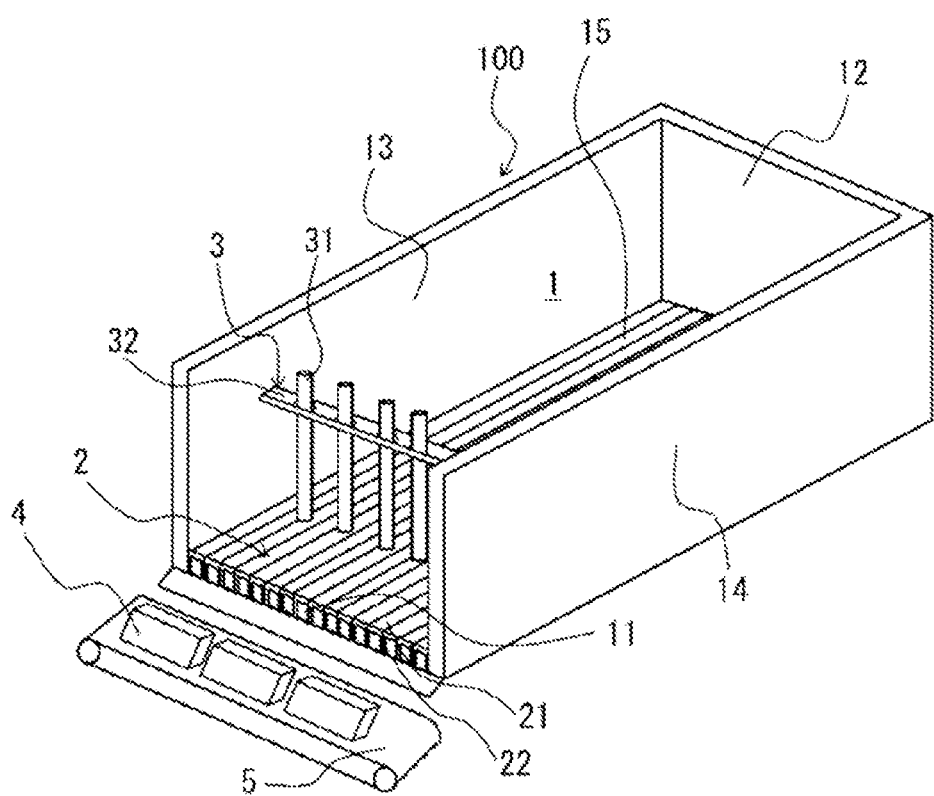
FIG. 1 is a perspective view showing a raw material discharge device according to a first embodiment of the present invention.

Hereinafter, embodiments of the present invention will be described with reference to the drawings. In the description of the drawings below, the same or similar parts are designated by the same or similar reference numerals. It should be noted that the embodiments shown below exemplify devices and methods for embodying the technical idea of the present invention, and the technical idea of the present invention does not limit structures, arrangement, and the like of components to those described below.

First Embodiment (Raw Material Discharge Device)

As shown in FIG. 1, a raw material discharge device 100 according to a first embodiment of the present invention includes a storage unit 1 which stores a raw material, a discharge unit 2 which discharges the raw material to an outside of the storage unit 1, and an adjustment unit 3 which adjusts an amount of the raw material to be discharged by holding a part of the raw material.

The storage unit 1 has a discharge port at one end thereof. The storage unit 1 includes a rear surface 12, side surfaces 13, 14 opposing with each other, and a bottom surface 15. The raw material is provided on the bottom surface 15 of the storage unit 1.

The discharge unit 2 is provided on the bottom surface 15 of the storage unit 1. As the discharge unit 2, a so-called floor plate movable fixed-quantity feeder is used. For example, the discharge unit 2 includes a plurality of guides 21 arranged at the bottom surface 15 of the storage unit 1 and extend from the rear surface 12 side to the discharge port 11 side of the storage unit 1 approximately in parallel with each other at an interval therebetween, a plurality of slats 22 provided on the guides 21 so as to cover the guides 21 and discharge the raw material to the outside of the discharge port 11 by reciprocating in the storage unit 1 along the guides 21 between the discharge port 11 and the rear surface 12, and a drive unit (not shown) configured to drive reciprocating movement of the plurality of slats 22.

As the plurality of slats 22 of the discharge unit 2 moves back and forth between the discharge port 11 and the rear surface 12, the raw material stored in the storage unit 1 is gradually pushed toward the discharge port 11 and then discharged out of the discharge port 11.

As shown in FIG. 1, the adjustment unit 3 is provided above the discharge unit 2 near the discharge port 11 and includes a plurality of struts 31 extending from above to below the discharge unit 2. The adjustment unit 3 adjusts an amount of the raw material to be discharged by holding a part of the raw material with the struts 31. The adjustment unit 3 includes a strut fixing unit 32 which is fixed between opposing side surfaces 13, 14 of the storage unit 1 and fixing the plurality of the struts 31 thereon, and a height adjustment unit (not shown) which adjusts a height of the struts 31 from the bottom surface of the storage unit 1.

The strut fixing unit 32 may have an arbitrary structure without being limited to the example of FIG. 1 as long as the strut fixing unit 32 can fix the plurality of struts 31 to a predetermined position so that the plurality of struts 31 are not moved to the discharge port 11 side by receiving pressure of the raw material put out from the rear surface 12 side to the discharge port 11 side.

In the example of FIG. 1, a columnar strut fixing unit 32 is bridged between the side surface 13 and the side surface 14, and the plurality of struts 31 are respectively housed in a plurality of openings provided in the strut fixing unit 32. The height of the struts 31 can be fixed at any height by the height adjustment unit which is composed of a fixture (not shown) such as a bolt and a flange provided in the strut fixing unit 32 near the openings.

A height detection unit 33 which detects the height of each of the struts 31 from a floor, which t is an upper surface of the slat 22, may be provided on the strut fixing unit 32. For example, a microwave sensor or the like may be used as the height detection unit 33. A control device 34 that can change the height of the struts 31 according to a storage state of the raw material by controlling the height detection unit 33 that adjusts the height of the struts based on a detection result of the height adjustment unit 33 may be provided.

Distances d1 and d2 of the plurality of struts 31 and heights H1 and H2 from the floor may be adjusted depending on types of the raw material to be discharged. In particular, as a result of diligent study to smoothly convey and discharge the raw materials such as the electronic and electrical device component scraps in which the raw materials having various shapes, specific gravities, and shapes are mixed, without any stagnation of the raw materials, it was found that it is effective to adjust a distance, a ratio of distances, a height and a ratio of heights of each of the plurality of the struts 31.

The present inventor has examined and found that when the raw material having various shapes, specific gravities, and shapes, such as the electronic and electrical device component scraps, are stored in the raw discharge device 100 as shown in FIG. 1, as the discharging operation progresses, the raw material in the vicinity of the side surfaces 13, 14 are not discharged properly and become stagnant, and the stagnant raw material may further entangled with the raw material in the central portion and may not be discharged properly, resulting in clogging (bridging).

Figure 2:
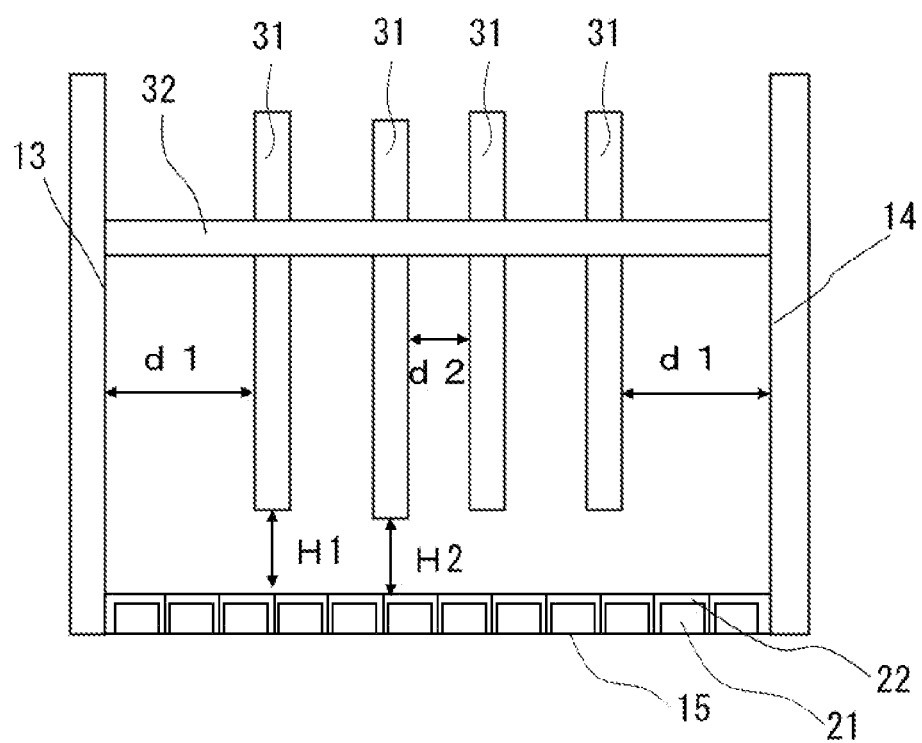
FIG. 2 is a front view of the raw material discharge device according to the first embodiment of the present invention as viewed from a discharge port.

In the present embodiment, as shown in FIG. 2, it is preferable to respectively adjust a ratio (d1/d2) of a distance (d1) between a strut 31 closest to the side surface 13, 14 of the storage unit 1and the side surface 13, 14 of the storage unit 1 to a narrowest distance (d2) between the struts 31 in a center portion, and a ratio (H1/H2) of a height (H1) of the strut 31 closest to the side surface 13, 14 of the storage unit 1 from the floor to a minimum height (H2) of a strut 31 other than the strut 31 closest to the side surface 13, 14 of the storage unit 1 of the floor, so as to prevent clogging of the raw material near the side surface 13, 14 of the storage unit 1.

More specifically, it is preferable to arrange the plurality of struts 31 so that H1/H2=3 to 10 when d1≤d2, and 0.3 or more is preferable when d1/d2 is 1 or less. It is preferable to arrange the plurality of struts 31 so that H1/H2=0.5 to 3 when d1>d2, and 5 or less is preferable when d1/d2 is greater than 1. This provides the raw material discharge device 100 capable of efficiently dispensing a fixed amount of raw material at each time, which is a mixture of raw materials of various shapes, specific gravities, and shapes.

The number of struts 31 is not limited, but can be, for example, 3 to 10, preferably 3 to 8, and even more preferably 4 to 6. The heights H1 and H2 of each strut 31 from the bottom surface 15 are adjusted according to the condition of the raw material. In this embodiment, the "distance d2 between the struts 31 in the center portion" refers to the distance between the strut 31 closest to the center portion and the next closest strut 31 to the center portion in the horizontal direction of the storage unit 1.

Figure 3:
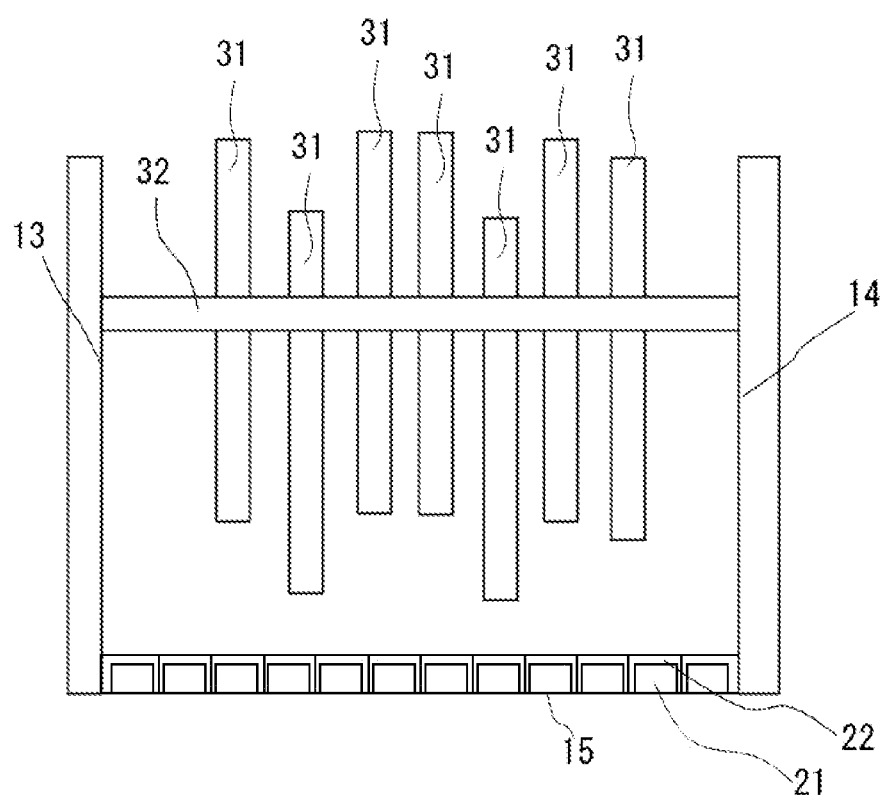
FIG. 3 is a schematic diagram showing an arrangement example of struts of an adjustment unit provided in the raw material discharge device.

The height of each of the struts 31 may be changed so that they are at different heights along the horizontal direction according to a stagnation of the raw material. For example, as shown in FIG. 3, if the raw materials are stuck near the strut 31 at the center portion and are difficult to discharge, the height of the strut 31 at the center portion may be made higher than the height of the struts 31 of the side surface 13, 14 side, so that the raw materials are more easily to be discharged from near the center. Although not limited to the following, in this embodiment, for example, a length from the side surface 13 to the side surface 14 of the storage unit 1 can be 300 to 500 m, and the height H from a top surface of the discharge unit 2 to the lower end of the struts 31 can be 500 mm to 800 mm.

In the example of FIG. 1, an example is described in which an adjustment unit 3 for adjusting the amount of the raw material to be put out to the outside of the storage unit 1 while holding the raw material in the storage part 1 is provided at one place on the side of the discharge port 11. However, it is preferable that a plurality of the adjustment part 3, preferably two or more, or even three or more, at a certain interval from the discharge port 11 side to the rear surface 12 side. By providing a plurality of stages of the adjustment parts 3 and adjusting the heights of the struts 31 provided with the respective adjustment units 3, the raw material can be controlled so as to be smoothly put out while suppressing the congestion of the raw material. In particular, the height of the raw material in front of the adjustment unit 3 may be preferably 1.3 to 5 times as large as H2, and more preferably 3 times or less.

(Raw Material Discharge Method)

Figure 4A:
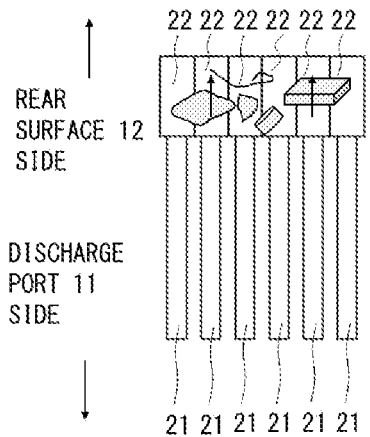
FIGS. 4A to AC are plan views showing an operation of a discharge unit provided in the raw material discharge device.
Figure 4B:
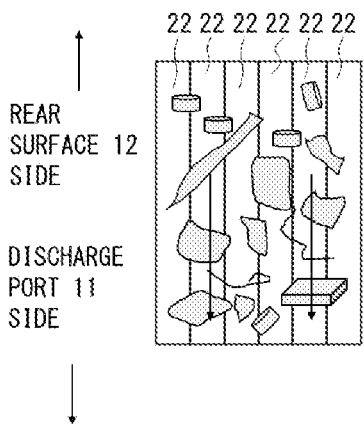

First, when discharging the raw material by using the material discharge device 100 as shown in FIG. 1, place the raw material on the bottom surface 15 of the storage unit 1, and then drive the discharge unit 2 by the drive unit not shown in the figure. Specifically, as shown in FIG. 4A, at first, all the slats 22 are moved from the discharge port 11 side to the rear surface 12 side so that the guides 21 placed below the slats 22 near the discharge port 11 side are exposed. Next, as shown in FIG. 4B, all the slats 22 are moved from the rear surface 12 side to the discharge port 11 side while holding the material contained in the rear surface 12 side so that the raw material is transported to the discharge port 11 side.

Figure 4C:
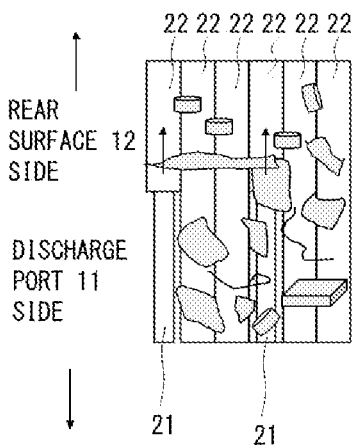

As shown in FIG. 4C, some of the slats 22 are moved from the discharge port 11 side to the rear surface 12 side. In this embodiment, an example of three adjacent slats 22 operating as one set is shown, but of course this is not limited to this example. In the example of FIG. 4C, the leftmost slat 22 and the fourth slat 22 from the left are moved to the rear surface 12 side, and the raw material is held on the leftmost guides 21 and the fourth guides 21 from the left.

Figure 5A:
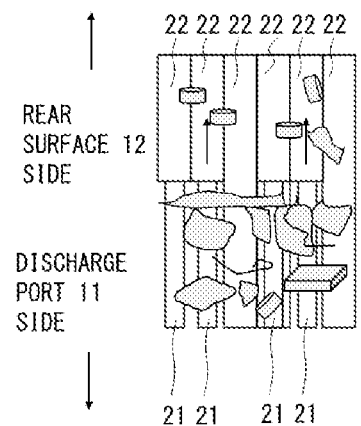
FIGS. 5A to 5C are plan views showing the operation of a discharge unit provided in the raw material discharge device.
Figure 5B:
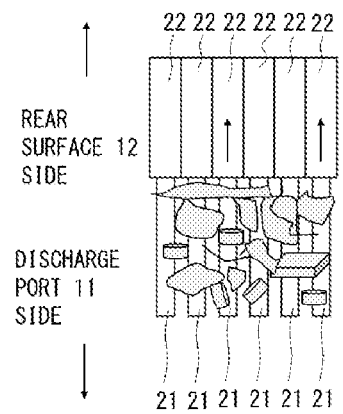
Figure 5C:
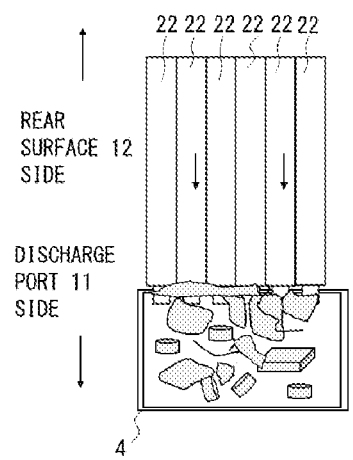

The slat 22 adjacent to the slat 22 that moved to the rear side 12 side in FIG. 4C, that is, the second slat 22 from the left and the fifth slat 22, are moved from the discharge port 11 side to the rear surface 12 side as shown in FIG. 5A. Some of the raw material is held on the guides 21. As shown in FIG. 5B, the third slat 22 and the sixth slat 22 from the left are moved to the rear surface 12 side. After all slats 22 are moved to the rear surface 12 side, all slats 22 are moved to the discharge port 11 side as shown in FIG. 5C. As a result of this movement, the raw material on the guides 21 is pushed to the discharge port 11 and stored in a container 4 located below the discharge port 11. By repeating the operation from FIG. 4A to FIG. 5C multiple times, a certain amount of material is evenly distributed to a plurality of containers 4. The containers 4 are transported by a conveyor such as a belt conveyor, as shown in FIG. 1.

According to the raw material discharge device 100 and the discharging method of the first embodiment of the present invention, it is possible to provide a raw material discharge device 100 and a method of processing the electronic and electrical device component scrap, which are capable of efficiently discharging a raw material having various shapes, specific gravities and shapes in each fixed amount.

(Modification)

Figure 6:
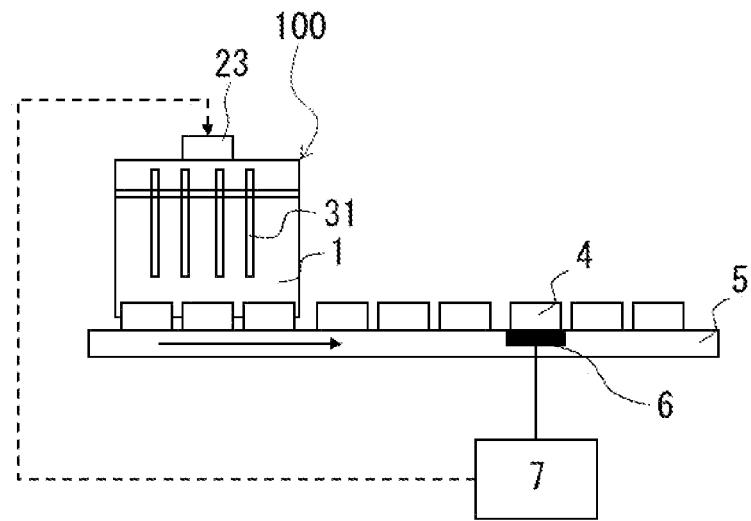
FIG. 6 is an explanatory diagram showing a raw material discharge system according to a modification of the raw material discharge device according to an embodiment of the present invention.

The raw material discharge device 100 may, for example, include a measuring unit 6 that measures a weight of the container 4 on the conveyor 5 that conveys the container 4 containing the raw material discharged from the storage unit 1, as shown in FIG. 6. The weight information of the raw material in the container 4 measured by the measuring unit 6 is sent to a raw material adjustment unit 7 composed of a general-purpose computer and the like, and the measurement result by the measuring unit 6 is analyzed by the raw material adjustment unit 7. Based on the results of this analysis, the drive unit 23, which drives the reciprocating movement of a plurality of slats 22, adjusts the number of reciprocating movements of the plurality of slats 22. As a result, the amount of the raw material stored in the container 4 is adjusted so that it becomes more appropriate in weight. According to the system as shown in FIG. 6, an appropriate amount of the raw material depending on the processing capacity of a sorter for processing the raw material can be adjusted according to the types of the raw material so as to be accommodated in the container 4. Highly efficient processing can be performed.

Second Embodiment (Raw Material Discharge Device)

Figure 7:
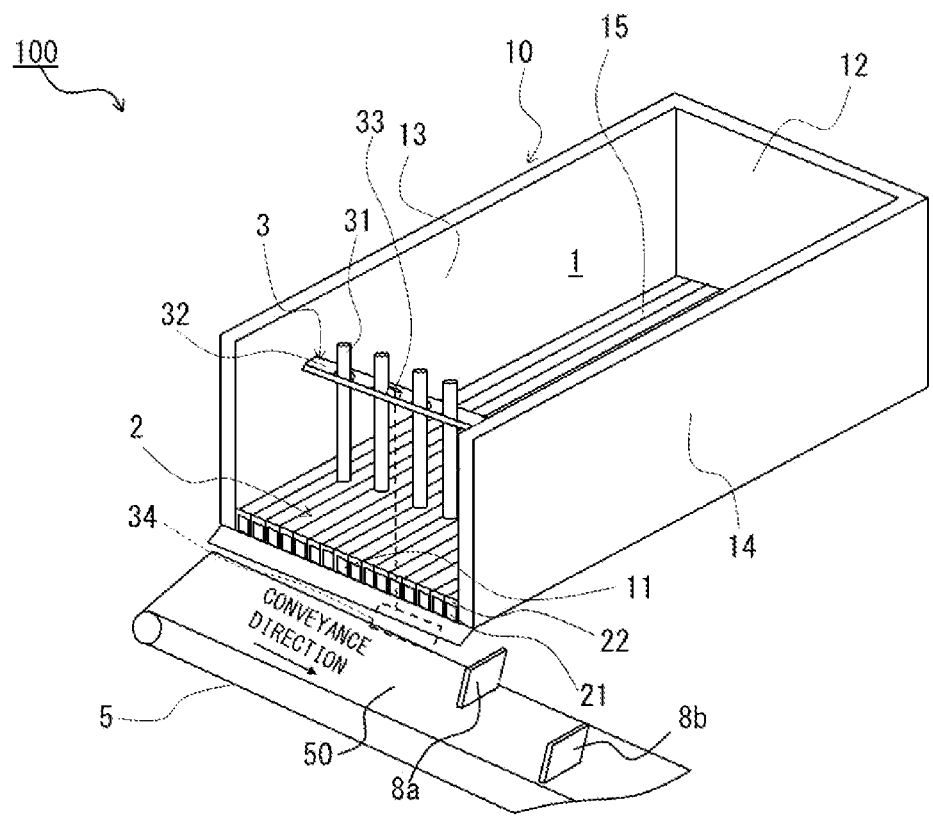
FIG. 7 is a perspective view showing a raw material discharge device according to a second embodiment of the present invention.

As shown in FIG. 7, a raw material discharge device 100 according to a second embodiment of the present invention includes a raw material discharge unit 10, a conveyor 5 having a conveyance surface 50 to convey the raw material 40 discharged by the discharge unit 10, and two or more guide plates 8a, 8b arranged on the conveyor 5 so as to project from both ends of the conveyance surface 50.

The raw material discharge unit 10 includes a storage unit 1 for storing a raw material 40, a discharge unit 2 for discharging the raw material 40 to the outside of the storage unit 1, and an adjustment unit 3 for adjusting an amount of the raw material to be discharged from the discharge port while holding a part of the raw material.

The storage unit 1 has a discharge port 11 at one end to discharge the raw material 40. The storage unit 1 includes a rear surface 12, side surfaces 13, 14 opposing with each other, and a bottom surface 15. The raw material 40 is provided on the bottom surface 15 of the storage unit 1. The discharge unit 2 is provided at the bottom surface 15 of the storage unit 1. As for the discharge unit 2, a so-called floor plate moving type metering feeder may be used.

For example, the discharge unit 2 includes a plurality of guides 21 that is arranged at the bottom surface 15 of the storage unit 1 and extends from the rear surface 12 side to the discharge port 11 side of the storage unit 1 approximately in parallel with each other at an interval therebetween, a plurality of slats 22 provided on the guides 21 so as to cover the guides 21 and discharge the raw material 40 to the outside of the discharge port 11 by reciprocating in the storage unit 1 between the discharge port 11 and the rear surface 12, and a drive unit (not shown) configured to drive reciprocating movement of the plurality of slats 22.

As the plurality of slats 22 of the discharge unit 2 moves back and forth between the discharge port 11 and the rear surface 12, the raw material 40 stored in the storage unit 1 is gradually pushed toward the discharge port 11 and then discharged out of the discharge port 11.

The adjustment unit 3 is provided above the discharge unit 2 near the discharge port 11 and includes a plurality of struts 31 extending from above to below the discharge unit 2. The adjustment unit 3 adjusts an amount of the raw material to be discharged out of the storage unit 1 while holding a part of the raw material with the struts 31. The adjustment unit 3 includes a strut fixing unit 32 which is fixed between opposing side surfaces 13, 14 of the storage unit 1 which fixes the plurality of the struts 31 thereon, and a height adjustment unit (not shown) which adjusts a height of the struts 31 from the bottom surface 15 of the storage unit 1.

The strut fixing unit 32 may have an arbitrary structure without being limited to the example of FIG. 7 as long as the strut fixing unit 32 can fix the plurality of struts 31 to a predetermined position so that the plurality of struts 31 are not moved to the discharge port 11 side by receiving pressure of the raw material put out from the rear surface 12 side to the discharge port 11 side.

In the example of FIG. 7, a columnar strut fixing unit 32 is bridged between the side surface 13 and the side surface 14, and the plurality of struts 31 are respectively housed in a plurality of openings provided in the strut fixing unit 32. The height of the struts 31 can be fixed at any height by the height adjustment unit which includes a fixture (not shown) such as a bolt and a flange provided in the strut fixing unit 32 near the openings.

A height detection unit 33 which detects the height of each of the struts 31 from a floor, that is, an upper surface of the slat 22 may be provided on the strut fixing unit 32. For example, a microwave sensor or the like may be used as the height detection unit 33. A control device 34 that can change the height of the struts 31 according to a storage state of the raw material 40 by controlling the height detection unit 33 that adjusts the height of the struts based on a detection result of the height adjustment unit 33 may be provided.

When the raw material 40 having various shapes, specific gravities, and shapes, such as the electronic and electrical device component scraps, are stored in the raw discharge device 100 as shown in FIG. 7, as the discharging operation progresses, the raw material 40 near the side surfaces 13, 14 may not discharged properly and become stagnant, and the stagnant raw material 40 may further entangled with the raw material 40 in the central portion and may not be discharged properly, resulting in clogging (bridging).

Figure 8:
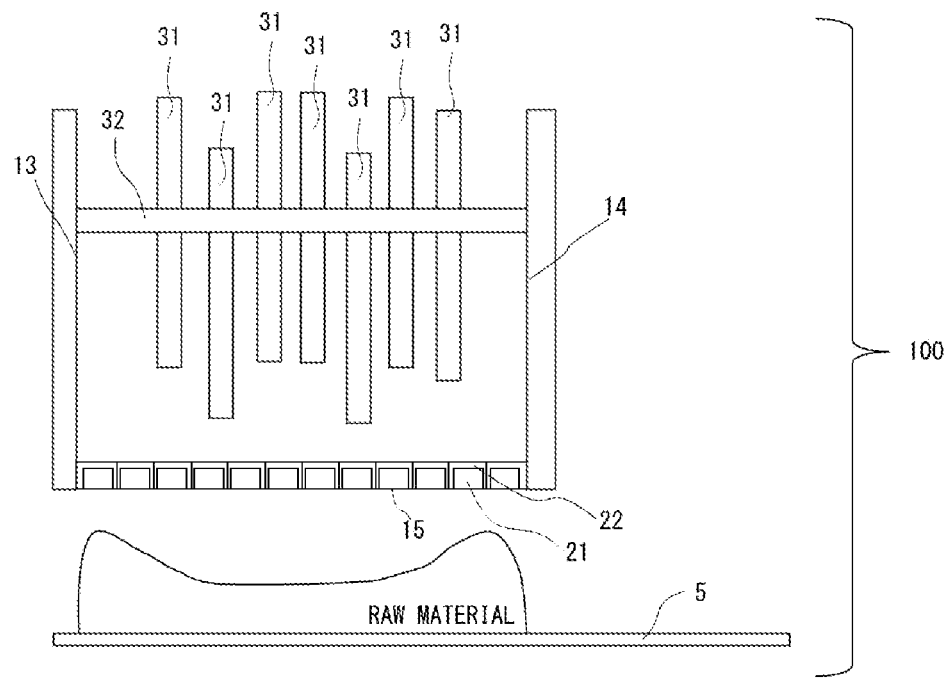
FIG. 8 is an explanatory diagram showing a bias state of the raw material conveyed on a conveyor provided with the raw material discharge device according to the second embodiment of the present invention.

In the present embodiment, as shown in FIG. 8, it is preferable to adjust a ratio (d1/d2) of a distance (d1) between a strut 31 closest to the side surface 13, 14 of the storage unit 1 and the side surface 13, 14 of the storage unit 1 to a narrowest distance (d2) between the struts 31 in a center portion, and a ratio (H1/H2) of a height (H1) of the strut 31 closest to the side surface 13, 14 of the storage unit 1 from the floor to a minimum height (H2) of a strut 31 other than the strut 31 closest to the side surface 13, 14 of the storage unit 1 from the floor so as to prevent clogging of the raw material near the side surface 13, 14 of the storage unit 1.

More specifically, it is preferable to arrange the plurality of struts 31 so that H1/H2=3 to 10 when d1≤d2, and it is preferable to arrange the plurality of struts 31 so that H/1H2=0.5 to 3 when d1>d2. This provides the raw material discharge device 100 capable of efficiently dispensing a fixed amount of raw material at each time, which is a mixture of raw materials of various shapes, specific gravities, and shapes.

The number of struts 31 is not limited, but can be, for example, 3 to 10, preferably 3 to 8, and even more preferably 4 to 6. The heights H1 and H2 of each strut 31 from the bottom surface 15 are adjusted according to the condition of the raw material.

The height of each of the struts 31 may be changed so that they are at different heights along the horizontal direction according to the stagnation of the raw material. For example, as shown in FIG. 8, if the raw materials are stuck near the strut 31 at the center portion and are difficult to discharge, the height of the strut 31 at the center portion may be made higher than the height of the struts 31 of the side surface 13, 14 side, so that the raw materials are more easily to be discharged from near the center. Although not limited to the following, in this embodiment, for example, a length from the side surface 13 to the side surface 14 of the storage unit 1 can be 300 to 500 m, and the height H from a top surface of the discharge unit 2 to the lower end of the struts 31 can be 500 mm to 800 mm.

In the example of FIG. 7, an example is described in which an adjustment unit 3 for adjusting the amount of the raw material 40 (not shown) to be put out to the outside of the storage unit 1 while holding the raw material in the storage part 1 is provided at one place on the side of the discharge port 11. However, it is preferable that a plurality of the adjustment part 3, preferably two or more, or even three or more, at a certain interval from the discharge port 11 side to the rear surface 12 side. By providing a plurality of stages of the adjustment parts 3 and adjusting the heights of the struts 31 provided with the respective adjustment units 3, the raw material 40 can be controlled so as to be smoothly put out while suppressing the congestion of the raw material 40.

(Raw Material Discharge Method)

When discharging the raw material by using the material discharge device 100 as shown in FIG. 7, at first, place the raw material 40 on the bottom surface 15 of the storage unit 1, and then drive the discharge unit 2 by the drive unit which is not shown in the figure. Specifically, as shown in FIG. 4A, all the slats 22 are moved from the discharge port 11 side to the rear surface 12 side so that the guides 21 placed below the slats 22 near the discharge port 11 side are exposed. Next, as shown in FIG. 4B, all the slats 22 are moved from the rear surface 12 side to the discharge port 11 side while holding the material contained in the rear surface 12 side so that the raw material is transported to the discharge port 11 side.

As shown in FIG. 4C, some of the slats 22 are moved from the discharge port 11 side to the rear surface 12 side. In this embodiment, an example of three adjacent slats 22 operating as one set is shown, but of course this is not limited to this example. In the example of FIG. 4C, the leftmost slat 22 and the fourth slat 22 from the left are moved to the rear surface 12 side, and the raw material 40 is held on the leftmost guides 21 and the fourth guides 21 from the left.

The slat 22 adjacent to the slat 22 that moved to the rear side 12 side in FIG. 4C, that is, the second slat 22 from the left and the fifth slat 22, are moved from the discharge port 11 side to the rear surface 12 side as shown in FIG. 5A. Some of the raw material is held on the guides 21. As shown in FIG. 5B, the third slat 22 and the sixth slat 22 from the left are moved to the rear surface 12 side. After all slats 22 are moved to the rear surface 12 side, all slats 22 are moved to the discharge port 11 side as shown in FIG. 5C. As a result of this movement, the raw material 40 on the guides 21 is pushed to the discharge port 11 and stored in a container 4 located below the discharge port 11.

According to the raw material discharge device 10 as shown in FIG. 7, by repeating the operation from FIG. 4A to FIG. 5C multiple times, an almost constant amount of raw material 40 is distributed onto the conveyance surface 50 at the end of each reciprocating motion of the slats 22, making it possible to keep the discharge amount almost constant at all times.

Figure 9:
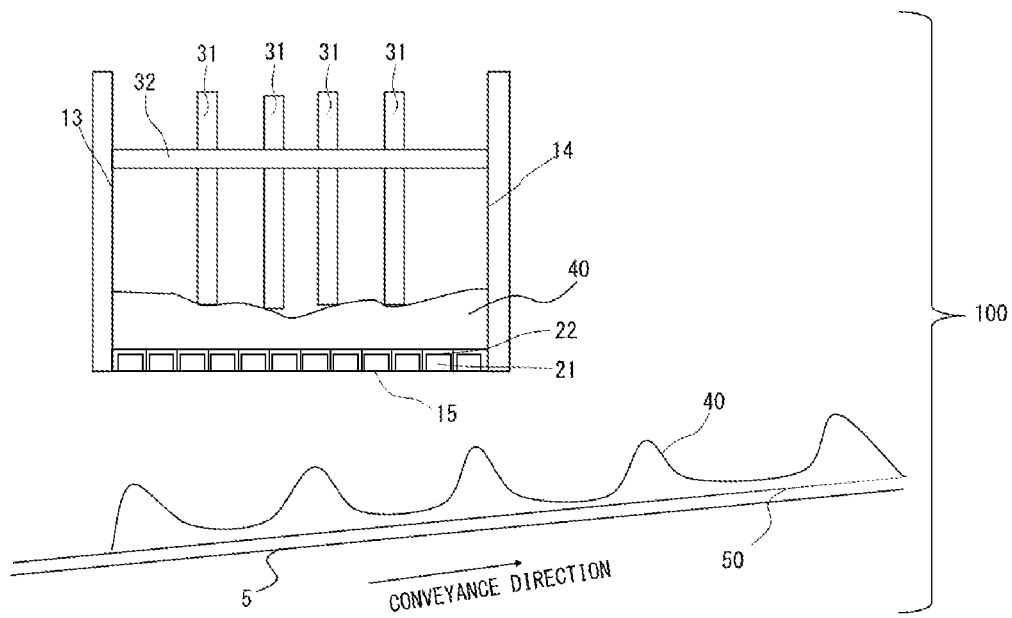
FIG. 9 is an explanatory diagram showing the bias state of a raw material conveyed on the conveyor provided with the raw material discharge device according to the second embodiment of the present invention.

In addition, as shown in FIG. 9, when it is focused on a placement condition of the raw material 40 on the conveyance surface 50 of the conveyor 5, the amount of the raw material 40 discharged with one-time discharge by using the slats 22 may vary along the conveyance direction of the conveyance surface 50 of the conveyor 5. When the amount of the raw material 40 discharged by the one-time discharge varies along the conveyance direction of the conveyance surface 50 of the conveyor 5, the amount of the raw material 40 fed into the sorting machine or the like which is at the destination of the conveyor 5 may vary over time, which may impair the stability of the sorting process.

Figure 10A:
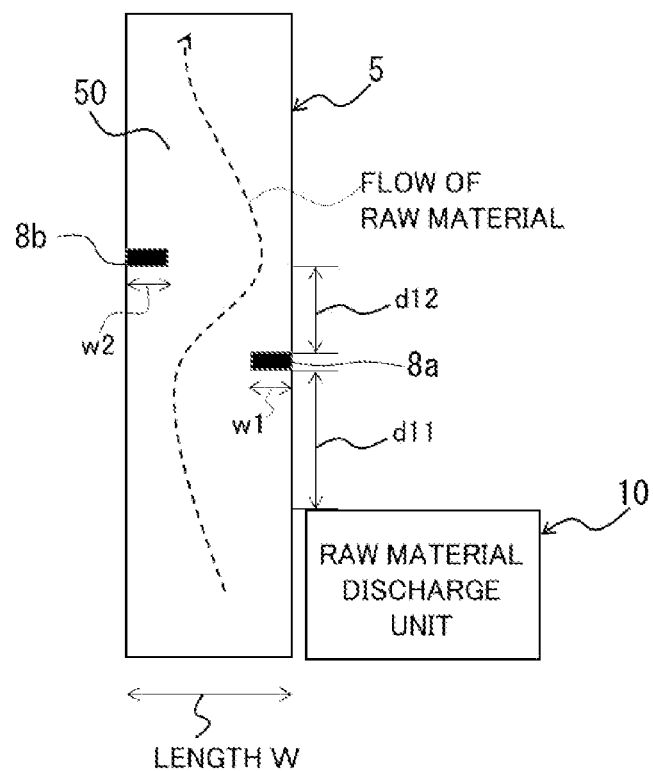
FIG. 10A is a plan view showing an arrangement relationship of guide plates arranged on the conveyor.

According to the raw material discharge device 100 of the second embodiment, two or more guide plates 8a, 8b are arranged on the conveyor 5, which are separated in the conveyance direction of the conveyor 5. As shown in FIG. 10A, as the raw material 40 to be discharged from the raw material discharge unit 10 is brought into contact with these guide plates 8a and 8b, and the conveyance direction of the raw material 40 is adjusted so that the flow of the raw material 40 meanders in the conveying direction, the bias of the raw material 40 can be averaged, and the volume of the raw material 40 conveyed by the conveyor 5 can be averaged in the conveyance direction. As a result, even when the conveyor 5 conveys raw materials 40 that are a mixture of various shapes, specific gravities, and shapes, it is possible to pay out the raw materials 40 more evenly.

even when the conveyor 5 conveys raw materials 40 that are a mixture of various shapes, specific gravities, and shapes, it is possible to pay out the raw materials 40 more evenly.

As shown in FIG. 10A, the guide plates 8a and 8b are arranged so that they alternately project from both ends of the conveyance surface 50 toward a center of the conveyance surface 50. In the example of FIG. 10A, the guide plates 8a and 8b are arranged so as to extend in a direction substantially perpendicular to the conveyance direction. The raw material 40 can be conveyed more smoothly while suppressing clogging of the raw material 40 (not shown) near the guide plates 8a and 8b by arranging the guide plates 8a and 8b so as to face in the direction slightly inclined with respect to the direction perpendicular to the conveyance direction.

The shapes of the guide plates 8a and 8b the same and that makes it possible to more uniformly discharge the raw material 40 in which the raw materials 40 having various shapes, specific densities, and shapes are mixed, while suppressing the clogging of the raw materials 40 in the vicinity of the guide plates 8a and 8b. Namely, the lengths w1 and w2 of the guide plates 8a and 8b along a width direction of the conveyance surface 50 may be 20 to 40%, more preferably 25 to 35% with respect to the length W of the conveyance surface 50 in the width direction and that makes it possible to more smoothly while suppressing clogging of the raw material 40 in the vicinity of the guide plates 8a and 8b.

Figure 10B:
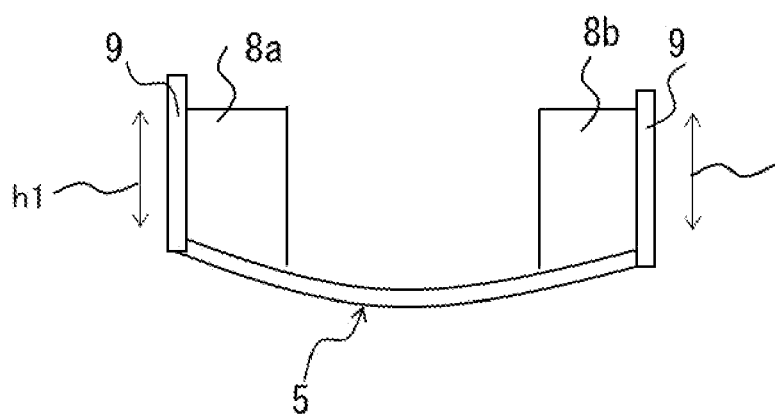
FIG. 10B is a side view of the conveyor and the guide plates as viewed from a conveyance direction.

As shown in FIG. 10B, the heights h1 and h2 of the guide plates 8a and 8b from the conveyance surface 50 at the end of the conveyor 5 are higher than the maximum height of the raw material 40 discharged on the conveyance surface 50. Accordingly, the raw material 40 can be meandered and averaged more reliably. The heights h1 and h2 may be the same as or lower than the height of the side guides 9 provided on both sides of the conveyor 5, but specifically, the heights h1 and h2 may be 250 to 500 mm, and in one embodiment, 300 to 450 mm.

If an interval d12 in which the guide plates 8a and 8b are arranged is too narrow, the raw material 40 is likely to be clogged, and there is a problem that it is difficult to take measures when the raw material 40 is clogged. If the interval d12 is wide, there is no particular problem, but if it is too wide, the equipment becomes longer. The length may be adjusted according to an installation location. As shown in FIG. 10A, the guide plates 8a and 8b are preferably separated by 300 mm or more in the conveyance direction, and more preferably 500 mm or more.

Further, if the distance of the guide plate 8a closest to the raw material dispensing unit 10 is too short, there may be no margin for eliminating the variation. If it is too far, there may be no problem but it is not preferable because the line becomes longer. As shown in FIG. 10A, the distance d11 from the raw material dispensing section 10 of the guide plate 8a closest to the raw material discharge unit 10 is preferably 200 mm or more, and preferably 300 mm or more.

The materials of the guide plates 8a and 8b are not particularly limited. Any material can be used as long as it is used for smoother conveyance while suppressing clogging in the vicinity of the guide plates 8a and 8b when processing the electronic and electrical device component scraps in which raw materials 40 of various shapes, specific densities, and shapes are mixed, However, it is preferable to be made of metal, for example, aluminum or SUS, since the electronic and electrical device component scraps include metals and that may cause the wear of the plastics or the like.

Figure 11A:
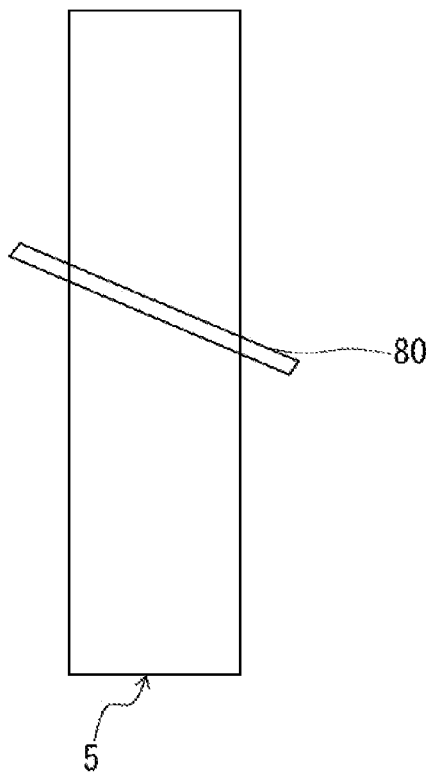
FIG. 11A is a plan view showing an arrangement relationship of collision plates of a comparative example.
Figure 11B:
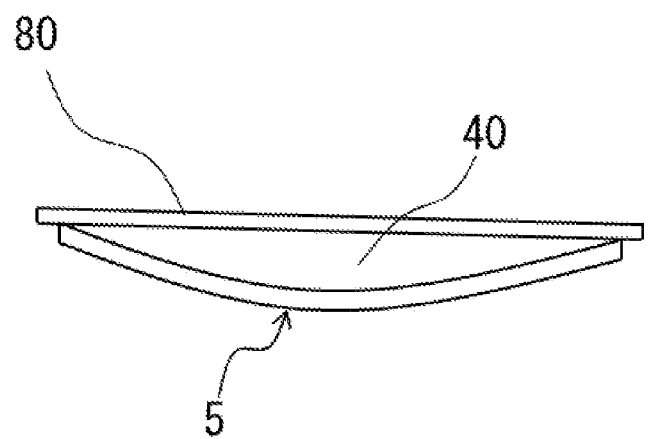
FIG. 11B is a side view showing the arrangement relationship of the collision plates of the comparative example viewed from the conveyance direction.

As shown in FIGS. 11A and 11B, when the collision plate 80 for adjusting the height of the raw material 40 was arranged on the conveyor 5, the raw material 40 was clogged and the raw material 40 was not smoothly conveyed. Even when the collision plate 80 was diagonally arranged on the conveyor 5, the clogging of the raw material 40 was not cleared.

According to the raw material discharge device 100 of the second embodiment, it becomes possible to more uniformly and smoothly convey the raw material 40 in which 40 in which the raw materials 40 having various shapes, specific densities, and shapes are mixed, by arranging the guide plates 8a, 8b as shown in FIG. 10A.

(Method of Processing an Electronic and Electrical Device Component Scrap)

The raw material discharge device 100 as shown in FIGS. 1 to 10 can be particularly suitable as an apparatus for sorting the electronic and electrical device component scrap having an amount that can be processed by sorting machines, before the electronic and electrical device component scrap is sorted by various sorting machines such as a wind power sorting machine, a metal sorter, a color sorter, and a sieving machine.

As used herein, the "electronic and electrical device component scrap" refers to scrap obtained by crushing electronic and electrical devices such as waste home electric appliances, PCs, and mobile phones, recovering them and then crushing them to have an appropriate size. In the present embodiment, the crushing for obtaining the electronic and electrical device component scrap may be performed by an operator. However, crushed objects may be purchased on the market.

The crushing method is carried out by any apparatus that is not limited to a specific apparatus, and may be carried out in sharing or shock manner. It is desirable to carry out crushing such that the shape of the component is maintained as much as possible. The apparatus does not include one belonging to the category of a crusher for the purpose of fine crashing.

The electronic and electrical device component scrap can be classified into component scrap including synthetic resins (plastics) used for substrates, parts such as ICs and connectors, and casings; wire scraps; metals; film-shaped component scrap; powders generated by crushing or pulverizing; and others, and they can be further classified into subclasses depending on purposes of the processing. In the present embodiment, the electronic and electrical device component scrap that has been crushed to have a particle diameter of 100 mm or less, more typically 50 mm or less, typically 10 mm or more, or 15 mm or more and has a percentage of individual components separated as component scrap of 70% or more may preferably be processed, although not limited thereto.

By using the raw material discharge device 100 according to the embodiment of the present invention to discharge the component scraps composed of various types in fixed quantities, it is possible to efficiently discharge the raw materials 40 that are a mixture of the raw materials of various shapes, specific gravities, and shapes. Then the raw material 40 to be supplied to the subsequent sorting and treatment processes can be supplied more smoothly. Furthermore, by processing each raw material 40 in a predetermined order, for example, when the sorted material is to be used in the copper smelting process, it is possible to obtain a raw material 40 enriched with valuable metals including gold, silver, platinum, palladium, and copper while minimizing substances of smelting inhibitors that are undesirable for processing in the copper smelting process, such as elements such as antimony (Sb) and nickel (Ni), resins, aluminum (Al), iron (Fe), and the like.

Thus, the present invention is not limited to each embodiment, and the components may be modified and embodied without departing from the spirit of the present invention. Further, various inventions may be created by appropriately combining the plurality of components disclosed in the present embodiment. For example, some components may be removed from all the components shown in the embodiments, or the components of different embodiments may be optionally combined.

DESCRIPTION OF REFERENCE NUMERALS

1 . . . Storage unit
2 . . . Discharge unit
3 . . . Adjustment unit
4 . . . Container
5 . . . Conveyor
6 . . . Measuring unit
7 . . . Raw material adjustment unit
8a, 8b . . . Guide plate
9 . . . Side guide
10 . . . Raw material discharge unit
11 . . . Discharge port
12 . . . Rear surface
13 . . . Side surface
14 . . . Side surface
15 . . . Bottom surface
21 . . . Guide
22 . . . Slats
23 . . . Drive unit
31 . . . Struts
32 . . . Slat fixing unit
33 . . . Height detection unit
34 . . . Control device
50 . . . Conveyance surface
80 . . . Collision plate
100 . . . Material discharge device

The invention claimed is:

1. A raw material discharge device comprising:
a storage unit which stores a raw material and comprising a discharge port at one end;
a discharge unit arranged at a bottom surface of the storage unit, which conveys the raw material toward the discharge port and discharges the raw material to an outside of the storage unit;
an adjustment unit comprising a plurality of struts extending from above to below the discharge unit and adjusting an amount of the raw material to be discharged by holding a pan of the raw material with the struts;
wherein a ratio (d1/d2) of a distance (d1) between a strut closest to a side surface of the storage unit and the side surface of the storage unit to a narrowest distance (d2) between the struts in a center portion of the storage unit, and a ratio (H1/H2) of a height (H1) of the strut closest to the side surface of the storage unit from a floor to a minimum height (H2) of a strut other than the strut closest to the side surface of the storage unit from the floor are respectively adjustable so as to prevent clogging of the raw material being discharged to the outside of the storage unit.

2. The raw material discharge device according to claim 1, wherein it is adjusted so that H1/H2=3 to 10 when d1≤d2, and it is adjusted so that H1/H2=0.5 to 3 when d1>d2.

3. The raw material discharge device according to claim 1, wherein the adjustment unit comprises:
a strut fixing unit fixed between opposing side surfaces of the storage unit, fixing the plurality of struts; and
a height adjustment unit adjusting a height of the struts from a bottom surface of the storage unit.

4. The raw material discharge device according to claim 1, wherein the discharge unit comprises:
a plurality of guides provided at a bottom surface of the storage unit extending from a rear surface side to a discharge port side of the storage unit having an interval therebetween;
a plurality of slats reciprocating in the storage unit along the guides and discharging the raw material out of the storage unit; and
a drive unit configured to drive reciprocating movement of the plurality of slats.

5. The raw material discharge device according to claim 1, further comprising:
a container containing the raw material discharged from the storage unit;
a conveyer conveying the container;
a measuring unit measuring a weight of the container; and
a raw material adjustment unit adjusting the amount of the raw material contained in the container based on a measurement result of the measuring unit.

6. The raw material discharge device according to claim 1, wherein the raw material comprises an electronic/electrical device component scrap.

7. A raw material discharge device comprising:
a raw material discharge unit comprising: a storage unit which stores a raw material and comprising a discharge port at one end; a discharge unit arranged at a bottom surface of the storage unit, conveying the raw material toward the discharge port and discharging the raw material to an outside of the storage unit; and an adjustment unit comprising a plurality of struts extending from above to below the discharge unit and adjusting an amount of the raw material to be discharged bye holding a part of the raw material with the struts;
a conveyer comprising a conveyance surface to convey the raw material discharged from the discharge port; and
two or more guide plates arranged apart from each other in a conveyance direction of the conveyor and arranged on the conveyor so as to alternately project from both ends of the conveyor surface.

8. The raw material discharge device according to claim 7, wherein the guide plates have a length along a width direction of the conveyance surface that is 20 to 40% of a total length in the width direction of the transport surface, respectively.

9. The raw material discharge device according to claim 7, wherein the guide plates are placed at a distance of 30 min or more in the conveyance direction.

10. The raw material discharge device according to claim 7, wherein one of the guide plates that is most adjacent to the raw material discharge unit is 200 mm or more away from the raw material discharge unit.

11. The raw material discharge device according to claim 7, wherein the guide plates are made of metal.

12. The raw material discharge device according to claim 7, wherein the raw material comprises an electronic/electrical device component scrap.

13. A method of processing an electronic and electrical device component scrap comprising:
storing electronic and electrical device component scraps in a storage unit to store a raw material, the storage unit comprising a discharge port provided at one end to discharge the raw material;
conveying the electronic and electrical device component scraps toward the discharge port by a discharge unit arranged at a bottom surface of the storage unit and discharging the electronic and electrical device component scraps to an outside of the storage unit while holding a part of the electronic and electrical device component scraps by adjusting a distance between a plurality of struts extending from above to below the discharge unit,
wherein a ratio (d1/d2) of a distance (d1) between a strut closest to a side surface of the storage unit and the side surface of the storage unit to a narrowest distance (d2) between the struts in a center portion of the storage unit, and a ratio (H1/H2) of a height (H1) of the strut closest to the side surface of the storage unit from a floor to a minimum height (H2) of a strut other than the strut closest to the side surface of the storage unit from the floor are respectively adjustable so as to prevent clogging of the electronic and electrical device component scraps being discharged to the outside of the storage unit.

14. The method of processing an electronic and electrical device component scrap of claim 13, wherein the electronic and electrical device component scraps are discharged on a conveyor arranged below the storage unit, the method further comprises:
averaging a height of the raw material by meandering a flow of the raw material by bringing the raw material into contact with two or more guide plates arranged along a conveyance direction of the conveyor so as to be alternately projected from both ends of a conveyance surface of the conveyor.

* * * * *